Jan. 24, 1956 R. A. O'NEILL 2,731,745
CHANGEABLE SIGN
Filed July 17, 1952 8 Sheets-Sheet 4
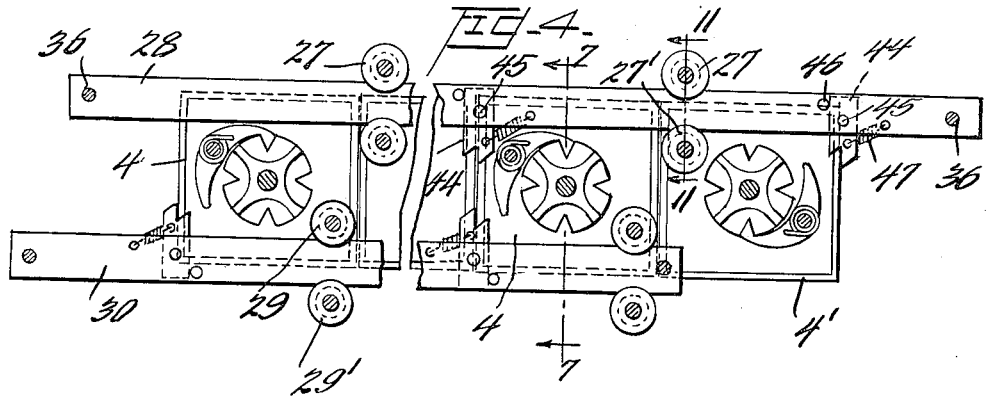
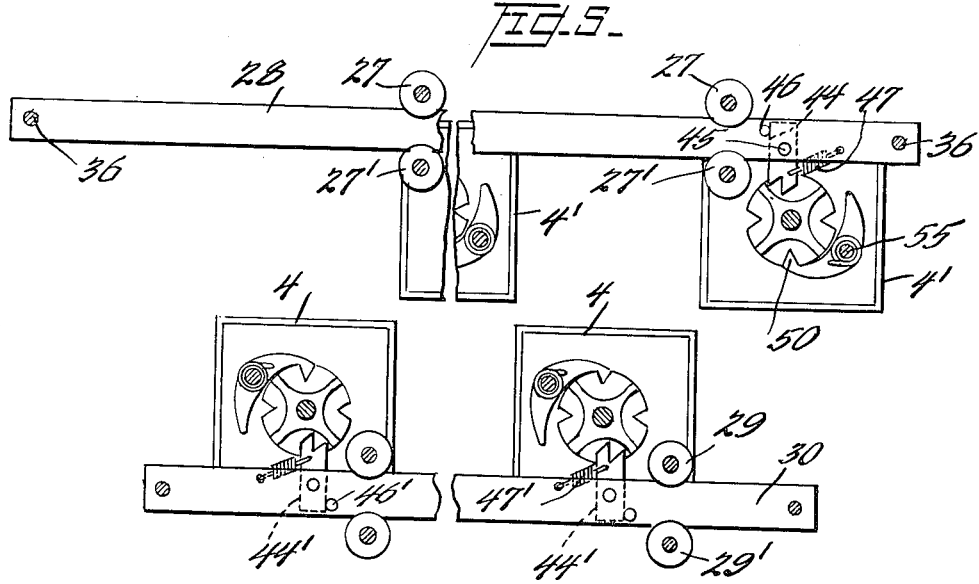
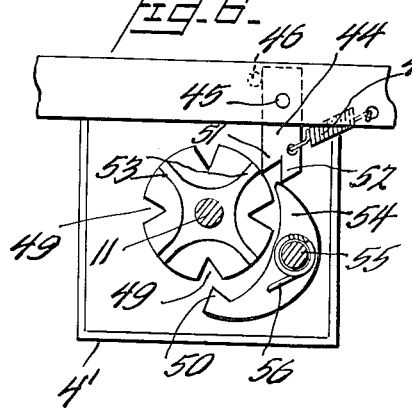
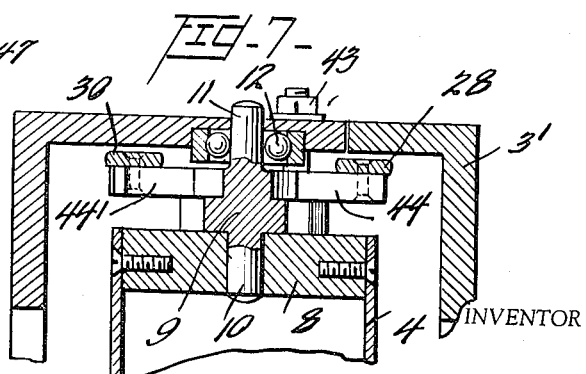
INVENTOR
Ralph A. O'Neill,
BY Albert Grobstein
ATTORNEY

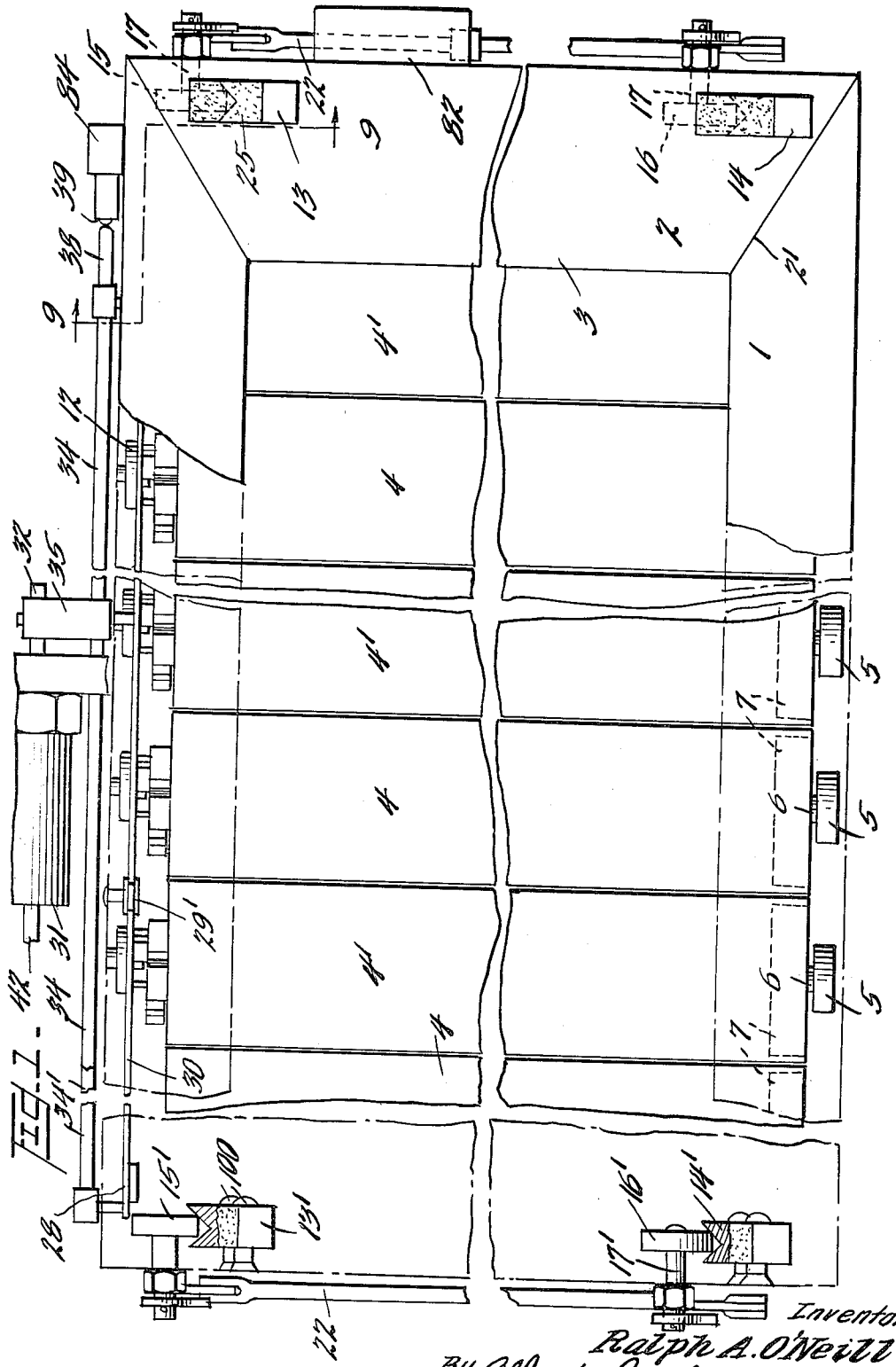

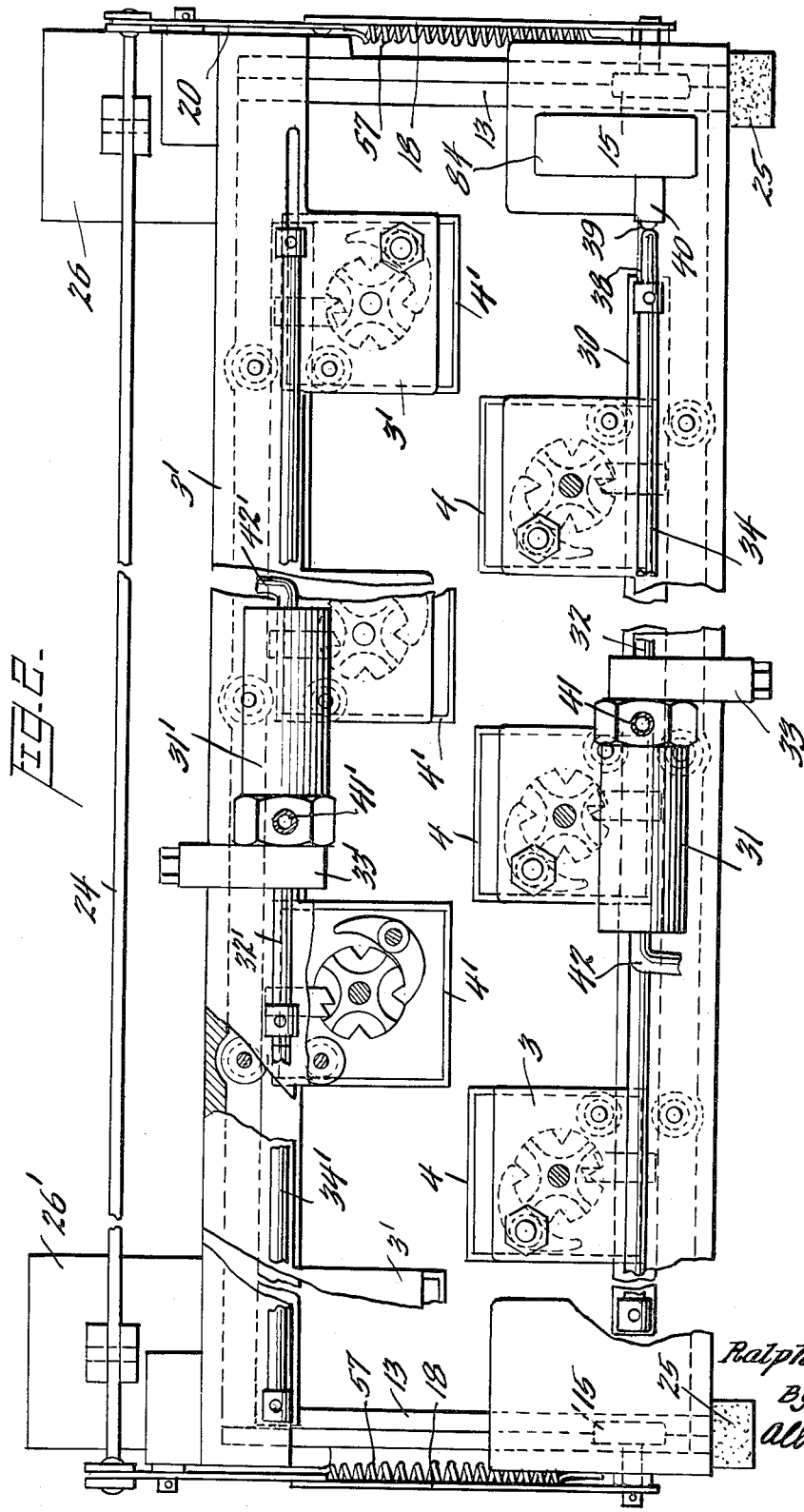

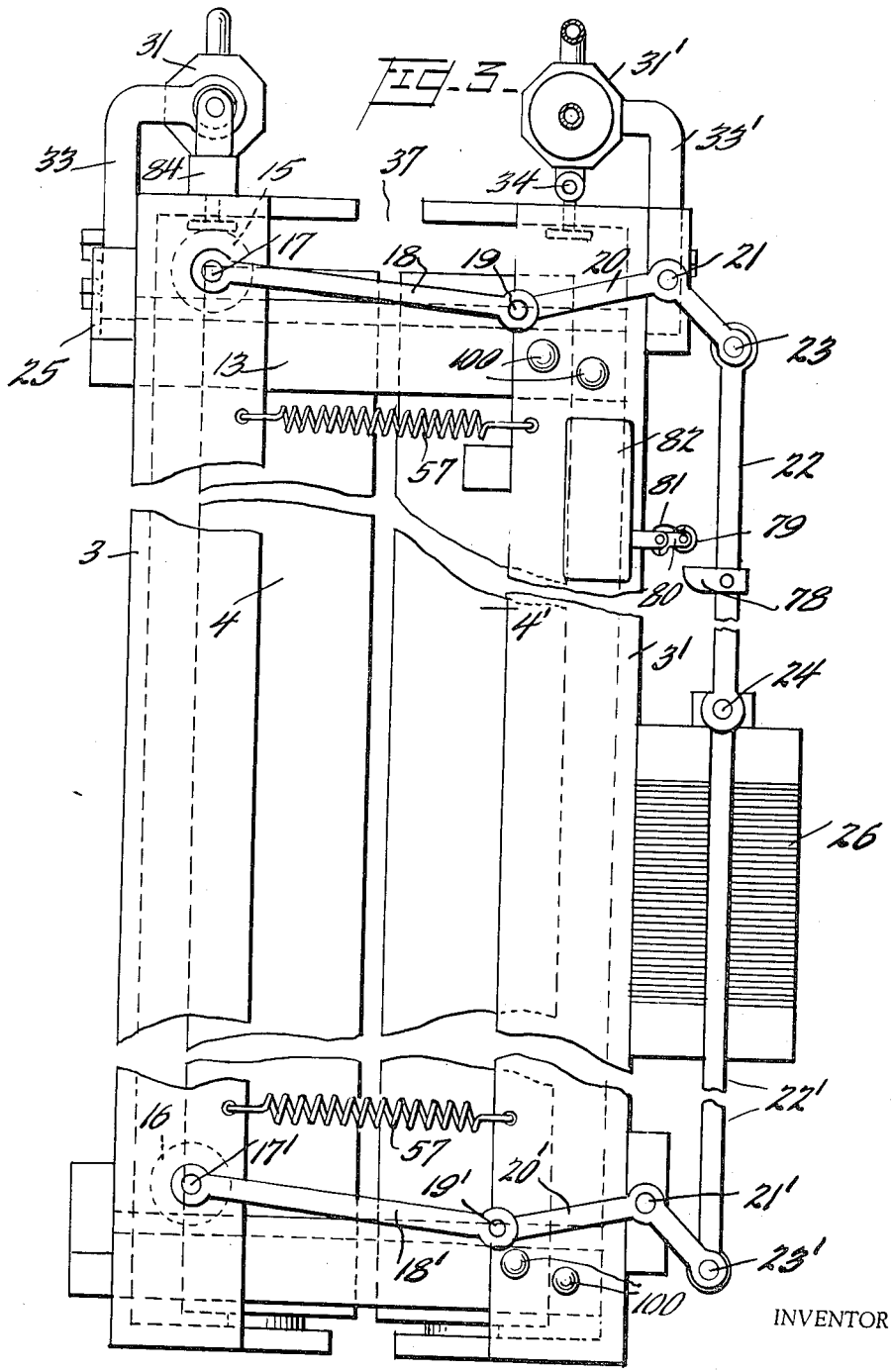

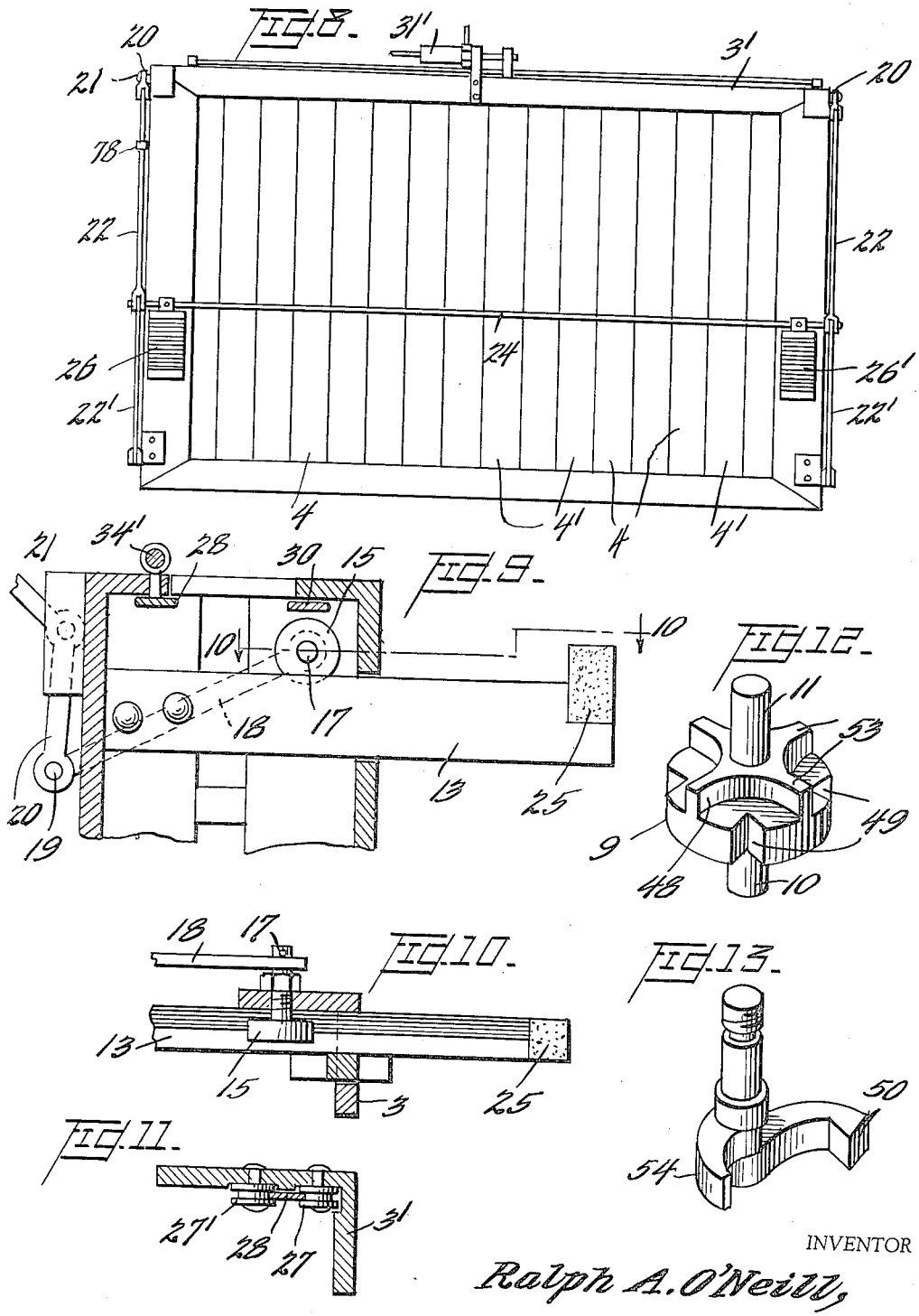

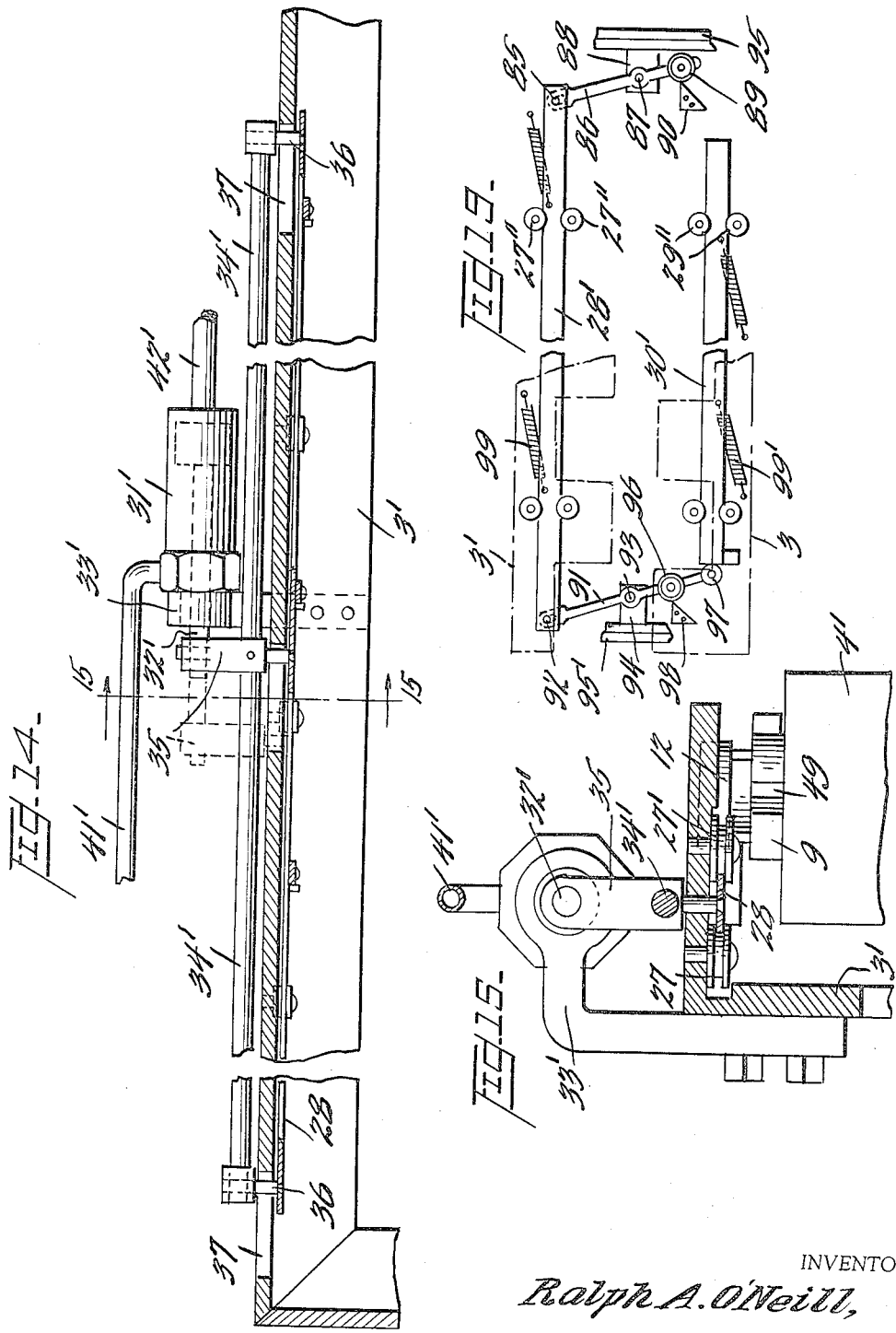

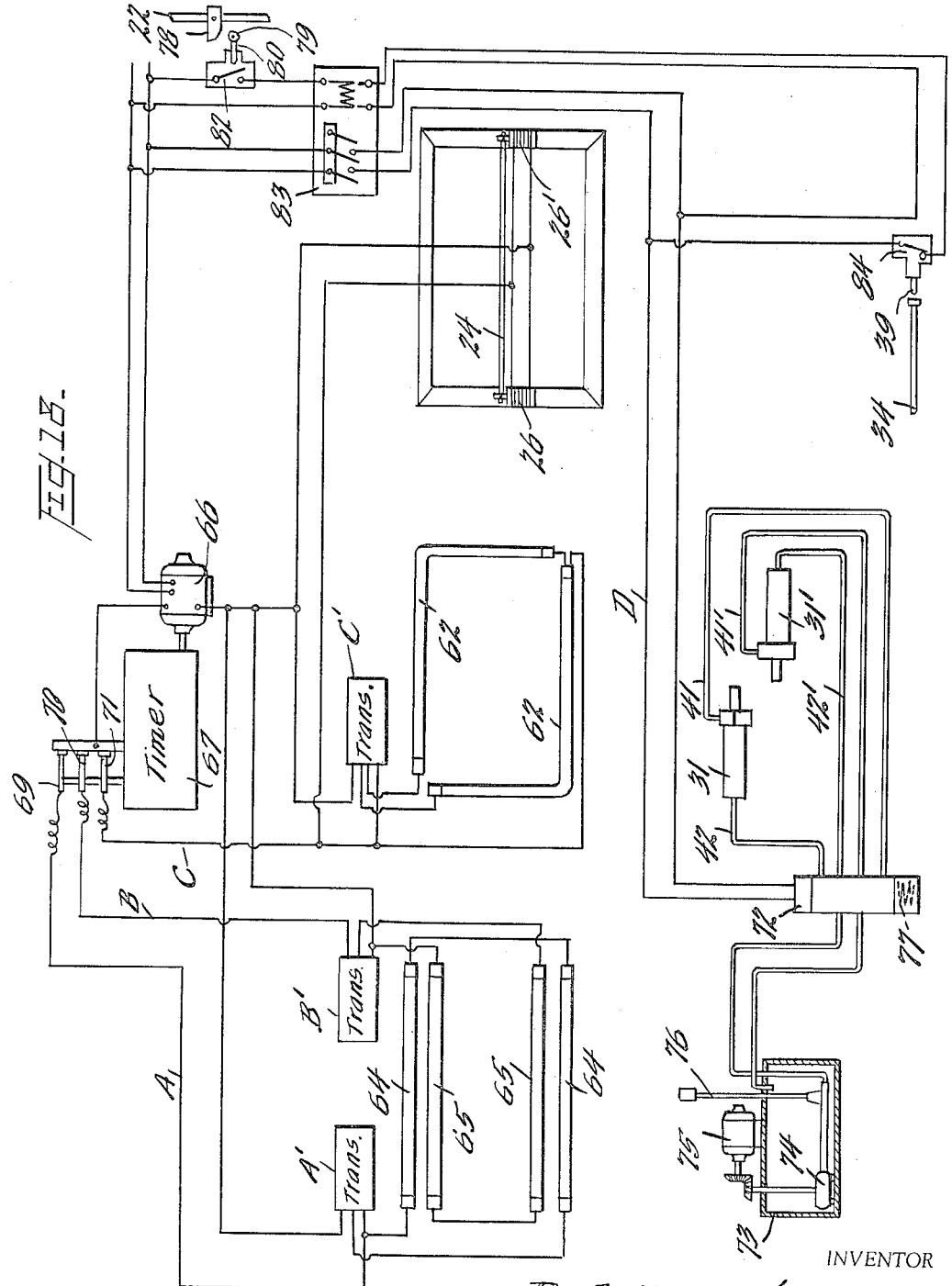

United States Patent Office 2,731,745
Patented Jan. 24, 1956

2,731,745

CHANGEABLE SIGN

Ralph A. O'Neill, Englewood, N. J.

Application July 17, 1952, Serial No. 299,444

24 Claims. (Cl. 40—76)

This invention relates to a changeable sign and mechanism for operating the same to produce a succession of displays; and more particularly, a sign and mechanism therefor highly useful for quick change exhibition of advertising.

The invention has for its objects a changeable display including mechanism for automatically causing a changed display to appear before the eyes of the observer with positive and certain timing.

The invention has for its object a changeable sign apparatus comprising in combination a plurality of complementary supporting frames relatively movable with respect to each other to assume open and closed positions, a plurality of rotatable sign display elements mounted on the frames in composite non-rotatable relation when the frames are in closed position to present a sign display, means for moving the frames relative to each other into open position to separate the display elements into rotatable relation, and means for rotating the display elements when in open position to present a different sign display when the frames are returned to closed position.

The invention has for its further object a display device comprising a pair of complementary frames having relative movement toward and away from each other, each frame carrying a plurality of rectangular display elements, each of which has four sides, each side being a potential display unit or portion of a display panel, all of said elements presenting a single display panel when the faces of the respective individual units are in abreast position, said display elements being movable with respect to each other to present other respective unit faces thereof in alignment or abreast position to present a new or successive display, and means for actuating the device.

Another object of the invention includes a changeable sign exhibitor apparatus having in combination a plurality of frames, display tubes mounted on each of the frames, means for causing relative movement between the frames, and means responsive to the movement between the frames to rotate the tubes and thus provide successive displays.

Another object of the invention includes a changeable sign exhibitor having a pair of frames relatively movable into open and closed position with respect to each other, and a plurality of display elements rotatable upon the relative opening movement of the frames to present different faces of such display elements and form a composite display upon relative closing movement of the frames.

The invention also has for its object the provision of a novel mechanism for rotation of one or more display elements in timed sequence whereby a different face or faces of such display element or elements presents a successive display.

Additional objects of the invention include a changeable sign exhibitor having a plurality of display elements illuminated in timed relation; a plurality of display elements illuminated in timed relation to the mechanical movement of relatively movable frames carrying the same; a changeable sign exhibitor having complementary lighting and illumination means coordinated with the mechanism of display-carrying frames which are relatively movable toward and away from each other; a changeable sign exhibitor having a pair of frames, rotatable display elements carried by the frames, means for moving one of the frames relative to the other frame into open position, means responsive to the relative movement of the frames into open position to rotate the display elements, and means effective upon the closing of the frames to illuminate the display elements; a changeable sign having a pair of frames movable into open and closed position and carrying rotatable display elements for sequential display, a border housing for the sign, border lighting means in said border housing, display element illumination means in said housing, and timing means for successively illuminating the display elements with the frames in closed position, and sequentially actuating the frame elements into open position with concurrent border lighting, whereby the display elements are not illuminated when the border is illuminated.

Other objects of the invention will be apparent from the description and claims herein.

The invention will be better understood by reference to the accompanying drawings, wherein:

Figure 1 is a view in front elevation, with portions broken away, of a preferred form of the changeable sign exhibitor with the display elements in open position.

Figure 2 is a top plan view of the device shown in Figure 1 with the display elements and frames in open position.

Figure 3 is a view in end elevation of the device of Figure 1 at its right hand end, and shown with the frames in open position.

Figure 4 is a plan view, with the housing omitted, of the rectangular display elements and operating mechanism therefor, the display elements being in closed position.

Figure 5 is a plan view, similar to that of Figure 4, with the display elements in open position.

Figure 6 is a plan view of a single display element tube showing the trigger dog disengaging the pawl from the composite cam-and-detent receiving element and beginning to engage the cam for rotation of the display element.

Figure 7 is a sectional view taken on the line 7—7 of Figure 4, showing in addition the upper angled portions of the frames.

Figure 8 is a view in rear elevation of the structure shown in Figure 1.

Figure 9 is a sectional view taken on the line 9—9 of Figure 1.

Figure 10 is a sectional view taken on the line 10—10 of Figure 9, showing the roller mounting on the track.

Figure 11 is a sectional view taken on the line 11—11 of Figure 4, showing the operating bar and guide rollers for same.

Figure 12 is a perspective view of the composite cam-and-detent receiving element.

Figure 13 is a perspective view of the pawl detent element.

Figure 14 is a view in side elevation of the mounting of a hydraulic ram to the top angle of the rear frame, the ram serving to operate a trigger bar.

Figure 15 is a view along the line 15—15 of Figure 14.

Figure 18 is a diagram of the electrical and hydraulic systems for the illumination and operation of the entire assembly.

Figure 19 is a plan view showing a modification of the trigger bar operating mechanism, wherein the trigger bars are reciprocated by rocking levers and springs.

Figure 16:
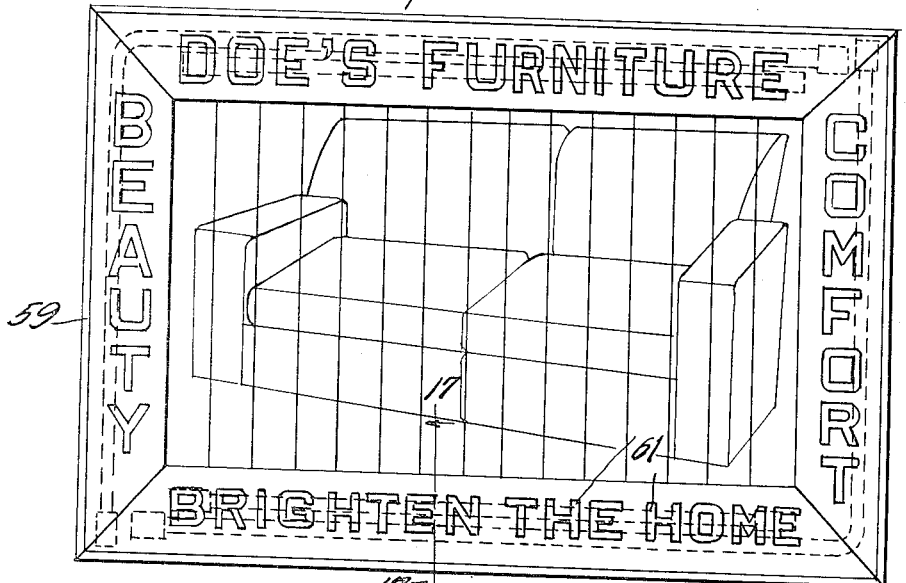
Figure 16 is a view in front elevation of the changeable sign exhibitor showing the sign with its illumination housing.

Referring to the drawings, and more specifically to Figures 1, 2 and 3, the numerals 1 and 2 represent two of the four prefabricated angle structures joined at miter 2' in the manner of a rectangular picture frame to form the front frame 3 upon which are mounted a number of vertically disposed rectangular tubular display elements 4. Likewise, the back frame 3' is composed of four angle pieces with miter joints and has a number of rectangular tubular display elements 4' mounted thereon. Each tube is square and is rotatably mounted on the frame 3, and correspondingly on the frame 3', on a ball bearing 5 through the medium of a journal 6 which is an extension of plug 7 which forms the base of a tube, and which plug is fixedly inserted in the bottom of the tubular display element. At the top of each tube, a fixedly inserted plug 8 (shown in Figure 7) carries a composite cam-and-detent receiving element 9 (shown in perspective in Figure 12) which has a depending portion 10 which is fixedly or immovably secured to the plug 8. It also has an upstanding portion 11 which functions as a journal in the ball bearing 12, a plurality of which bearings are correspondingly mounted in the top portion of each one of the frames 3 and 3'. As shown in Figure 2, it will be noted that a number of square tubes 4 are mounted on the front frame, and at staggered position a number of square tubes 4' are mounted on the back frame. As shown in Figure 1, the tubes are all rotatably mounted in bearings (as described hereinabove) between the top portions and the bottoms of the respective frames.

Referring to Figure 1, top tracks 13 and 13' are riveted or otherwise secured to the back frame, and bottom tracks 14 and 14' are likewise secured to or carried by the back frame. The back frame is stationary, and may be supported in any suitable manner on any suitable base. The front frame is movable with respect to the back frame and rides through the medium of the bearings or rollers 15, 15', 16, and 16' on the tracks 13, 13' and 14, 14' which are fixedly carried by the back frame. The movement of the front frame along the tracks causes the same to either approach or to move away from the back frame, depending upon whether the display elements are in closed position (as in Figure 4) or in open position (as in Figures 2 and 5). The movement of the front frame along the four tracks is effected by means of the mechanism shown in Figures 1, 2, 3, 8 and 9, each roller 15, 15' and 16, 16' having an axle or shaft 17 carried by frame 3 and each shaft 17 has pivoted thereon a connecting link 18 which is pivoted at 19 to a bell-crank 20. The bell-crank 20 is rotatable about the pivot 21 carried by the back frame and is connected at 23 to a drive rod 22, which is connected to the common operating rod 24 of the solenoids 26 and 26' bolted to or otherwise carried by the back frame. The roller mounting on the top track at the right hand side of Figure 1 is shown in detail in Figures 9 and 10, the rubber bumper 25 forming a noiseless stop for the reciprocating front frame assembly. The numerals 17' to 23' and 25' at the lower half of Figure 3 corresponds to the parts carrying numerals 17 to 23 and 25 at the upper half.

The front frame 3 and back frame 3' are preferably formed of aluminum or aluminum alloy fabricated in the form of right-angled material. As shown in Figure 1, the front frame is in the nature of a picture frame so that the tubes 4 and 4' with the display thereon may be seen. As will be observed from Figure 2, the front and back frames 3 and 3' are cut out in staggered form corresponding to each other, so that when the frames are in closed position, as in Figure 4, the panels are in alignment and the staggered portions of the frames are in mesh or abreast alignment. As shown in Figure 3, the frames 3 and 3' are flexibly connected by the springs 57.

The back frame is stationary, and with the movable front frame, constitutes a box-like structure that has inside thereof two top and two bottom tracks extending from front to rear thereof and mounted on the back frame, with a ball-bearing roller riding on each track. These tracks and rollers are shown at 13, 13', 14, 14', 15 and 15' and 16 and 16' in Figure 1, and as shown are mounted in the cornices of the box-like structure. On the outside of the frames at each of the four cornices wherein the tracks and rollers are carried, a bell-crank is mounted, from which bell-crank a connecting rod is linked to the shaft of the roller bearing aforesaid. This is shown in Figure 3, where two of the four bell-cranks 20 and 20' are seen; one at the top and one at the bottom. The other two bell-cranks are on the corresponding other end of the rear frame. The short arm of each bell-crank is attached to a drive rod 22, which is linked to a solenoid such as 26 or other actuator.

As shown particularly in Figures 2, 4, 5 and 11, the back frame has mounted thereon a number of pairs of guide rollers 27 and 27' between which an operating trigger bar 28 is movably guided. Likewise, the front frame has pairs of guide rollers 29 and 29' fixed thereto between which an operating trigger bar 30 is movably guided.

As shown in Figures 2, 14 and 15, a double acting hydraulic ram 31' having a plunger 32' is bracketed to the top angle of frame 3' at 33', the plunger 32' being linked to a push rod 34' by the block 35, the push rod being pinned to the trigger bar 28 by pins 36 which extend through three slots 37 in the frame. Correspondingly, a double acting ram 31 having a plunger 32 is bracketed on frame 3 and connected through a push rod 34 to trigger bar 30 through slots in the front frame 3. The oil lines 41 and 42 provide the hydraulic fluid for operating the ram 31, and correspondingly the oil lines 41' and 42' provide for the ram 31'. At the right hand end of push rod 34 (as shown in Figures 1 and 2), the rod culminates in a rounded contact end 38 adapted to contact a plunger 39 of a spring-pressed plunger switch 84, the purpose of which will be hereinafter described.

The operating trigger bar 28 carries a plurality of dogs or trigger elements 44 which are pivoted on 28 at respective points 45. The trigger dogs 44 are rotatable about the pivots 45 within the limits imposed by stops 46 fixed to the bar 28 and springs 47, which latter are attached between the respective trigger dogs and the bar 28. Correspondingly, trigger dogs 44' are pivoted on operating trigger bar 30 which carries stop elements 46' and trigger bar 30 also has attached thereto springs 47', which springs are attached to the trigger dogs 44'. As will be noted in the detail view of Figure 6, each trigger dog is provided with two contact projections or prongs 51 and 52, one of which is adapted to contact an arm 53 of the Maltese cross of the cam-detent-receiving element 9 and the other of which is adapted to contact the pawl detent element 54 which is pivoted on the pivot pin 55 secured to the frame by nut 43. The pawl 54 is movable by the projection 52 of the trigger dog 44 against the action of the pawl spring 56. Referring to Figures 12 and 13, the cam-detent receiving element is provided with the arms 53 forming a Maltese cross with arcuate surfaces 48 extending between the arms. In a plane below or offset from the arcuate surfaces are the angular detent receiving openings 49 adapted to engage the detent end 50 of the pawl 54. As shown in Figure 13, the detent portion 50 lies in a plane below or offset from the pawl contact portion, whereby proper functioning between the pawl element and cam-detent receiving element 9 is obtained, as will be understood from the description hereinafter of the specific operation of the device.

As shown in Figures 3 and 18, the drive rod 22 has a cam 78 mounted thereon which contacts a roller 79 mounted on an arm 80 which acts against a spring 81 to trip a one-way switch 82 to energize a magnetically held relay 83 (normally open), which relay makes a circuit to the hydraulic valve 72 and also makes the circuit through switch 84 back to the relay coil. The circuit D shown in Figure 18 includes therein a four-way hydraulic electric valve 72 with spring reverse 77 which controls the hydraulic fluid supply through conduits 41, 42, 41′ and 42′ to the hydraulic rams 31 and 31′ respectively, which operate the trigger bars 30 and 28 respectively. The hydraulic fluid, such as oil, is stored in an oil reservoir 73 and pumped therefrom by 74 operated by motor 75. A pressure control valve is shown at 76.

The operation of the preferred embodiment shown in Figures 1, 2 and 3 is as follows:

When the display tubes are in closed position, as in Figure 4, the switch 82 and relay 83 (shown in Figure 18) are normally open so that no electrical current flows to the solenoid-operated 4-way valve 72 for the hydraulic operation of the rams of 31 and 31′; hence the rams remain in closed position until the frames 3 and 3′ are opening. With the display tubes in closed position, as in Figure 4, energizing of the solenoids 26 and 26′ causes the bell-cranks to rotate and push the front frame away from the back frame. This causes the tubes 4 to be carried away and cleared from tubes 4′, as shown in Figures 3 and 5. As the drive rod 22 moves down, due to the energizing of the solenoid 26, the cam 78 mounted thereon trips the spring roller dog 79 to close the one-way switch 82 mounted on the back frame 3′ (see Figures 3 and 18) thereby energizing the relay coil 83 which makes the circuit to the hydraulic valve 72 and also makes the circuit through the plunger switch 84 mounted on the front frame 3, back to the relay coil 83. The cam 78 makes the circuit at switch 82 only for an instant, and though switch 82 springs open again, the circuit is held closed by the relay acting through the switch 84. As the solenoid (not shown) on the 4-way valve 72 is energized, the rams of 31 and 31′ are driven forward and carry the push rods secured thereto. Since each push rod (see push rod 34′ in Figure 14) is secured to an operating trigger bar, the push rods slide the respective operating bars 28 and 30, the bar 28 sliding to the left and the bar 30 to the right. When the bars 28 and 30 are set in motion, the trigger dogs 44 and 44′ respectively pivoted thereon move with them. These trigger dogs release the pawls 54 and also rotate the tubes 4 and 4′ by pushing an arm 53 of the Maltese-crosses of the cam-detent receiving elements 9. By reference to Figure 6, it is noted that the pawls are thus released and the tubes rotated by reason of the projections or prongs 51 and 52 of the trigger dogs. When the bar 28 slides to the left, the shorter projection 51 of the trigger dog 44 clears the pawl 54 without contacting it, but moves into contact with the arm 53 of the Maltese-cross to turn it a quarter revolution after the longer projection or prong 52 of the trigger dog 44 strikes the tail of pawl 54 and causes its detent end 50 to disengage from the V-groove 49 of the cam-detent receiving element 9. The trigger dog 44 thus rotates the tube 4′. Before the rotating motion of the tube 4′ is completed, the pawl 54 is released when no longer in contact with projection 52, and the detent 50 engages a succeeding V-groove of the element 9 to thus arrest the rotation of the tube 4′ at precisely 90 degrees.

Upon the movement of the push rod 34 to the right when the front frame is separated from the back frame, the contact end 38 of the rod presses the plunger 39 of the switch housing 40 and opens the switch 84, thus breaking the circuit to the relay 83 and opening the relay switch, and deenergizing the 4-way hydraulic valve 72. The spring 77 then reverses the valve and the rams return to the closed position, causing the push rods to slide the bars 28 and 30 back to original position, and springs 47 and 47′ causing the trigger dogs 44 and 44′ to resume their original positions.

Upon the completion of the rotation of the tube 4′ a quarter revolution and after the rams are returned to closed position, the solenoids 26 and 26′ are deenergized, and the front and back frames are brought back together by the springs 57 to the position shown in Figure 4, with the tubes abreast or in alignment, but with different faces thereof in alignment than before. It will be understood that while only the action of one trigger-dog 44, pawl 54 and cam-detent receiving element 9 has been described, all of the trigger dogs on bar 28 act similarly and in unison thereon, and all of the trigger dogs 44′ on bar 30 act similarly and in unison on the bar 30, whereby all the tubes 4 on front frame 3 and the tubes 4′ on the back frame 3′ rotate together.

It will be observed that switch 82 is a one-way switch, and when the drive-rod 22 returns to normal closed position upon the deenergizing of the solenoids 26 and 26′, the cam 78 on the drive-rod does not trip the switch 82 upon the closing of the frames. It is only upon the opening of the frames that the cam 78 is effective to trip the switch 82 and close the same for the purpose described. As indicated, the switch 82 and relay 83 are normally open, so that no current flows to the solenoid 4-way valve 72; hence, the rams remain in closed position until the frames are opening. As drive-rod 22 moves down, cam 78 trips the switch 82, the relay coil of 83 is energized and thus makes the circuit through control switch 84 back to the relay coil. The cam 78 makes the circuit at 82 only for an instant, and although switch 82 springs open again, the circuit is held by the relay, acting through switch 84. This energizes the hydraulic valve solenoid, the rams are driven forward for a short stroke, the tubes 4 and 4′ turn, and at the end of the stroke the plunger switch 84 is opened, thus breaking the circuit to the relay, opening the relay switch, and deenergizing the solenoid of the hydraulic valve 72. The spring 77 reverses the valve and the rams return to the closed position. All this occurs during the short period of time the frames are open.

It will be observed that each tube has four display faces, and the tubes may thus present different faces in successive alignment to display entire panels of different pictures or modifications thereof. Any reasonable number of tubes may be used. The operation described therein thus gives machine gun precision in the movement of the tubes carrying their four display faces. As noted, the solenoid operates the bell-crank to separate the front tubes from the back tubes, so that every other tube jumps out of line. Two solenoids are used, but there may be four if two are insufficient to overcome the load of the springs and the inertia of the weight of the front frames. The solenoids are in non-energized position with their plungers out of the electrical field when the tubes are in closed position. When energized, the pull from the solenoids causes equal pressure to act simultaneously to push the front frame from the back frame. The mechanism is described with solenoid operation, but other means, such as a hydraulic ram or motor, or an air cylinder may be used for actuating the mechanism. The cam-detent receiving element may be made integral with the insert plug 8 by forming the same in a single die casting, but it may be made in separate parts as shown in Figure 7. Noise in the device is eliminated as far as possible by the rubber bumpers 25, 25′, and squeaks are eliminated by ball-bearings pressed in the bearing blocks that carry and support the bell-cranks. The front frame is cut-out at the four front corners thereof to permit the tracks to come through. The front frame is non-shifting because of the grooved tracks in which the self-lubricating rollers ride.

The square tubes 4 and 4′ may be made of solid material, but it is preferred to make them of aluminum or aluminum alloy tubes, fitted with plugs at top and bottom as described. The tubes can be made of any suitable material. They may be made of wood, glass or plastic, and be transparent, and internally illuminated if desired. The tubes may be provided with any suitable decorative material, such as mosaic beads, paint, etc. to form a picture, sign, or display.

The solenoids are actuated by electric current with any suitable known timing mechanism to cause energizing and deenergizing. The device operates to separate the tubes in a fraction of a second and all tubes are rotated simultaneously 90 degrees to present a new picture. As indicated above, a picture can be changed several times a minute by means of changing the faces of the mechanical tubes, whereby the perfectly square tubes are in mesh or abreast alignment to provide a flat surface picture or panel, then the tubes are unmeshed by separating them into two planes, and rotated 90 degrees to expose new surfaces of the tubes, and the tubes are remeshed into abreast alignment in a single plane again to present a new picture or panel to view. This meshing and unmeshing is repeated continuously and four successive exposures of each tube comprises one complete cycle.

Referring to Figure 19, this modification of the invention relates to the mechanism for separating the frames 3 and 3' and for rotating the display tubes 4 and 4'. Trigger operating guide bars 28' and 30' (corresponding to bars 28 and 30 of Figures 4 and 5) are likewise guided between rollers 27" and rollers 29", and carry trigger dogs (not shown) in the same manner as the trigger dogs 44 and 44' are carried by the bars 28 and 30, and for the same purpose; viz, to contact cam-detent receiving elements 9 for the purpose of rotating the display tubes. The operating bars 28' and 30', instead of being actuated by a push rod 34' driven by a hydraulic ram as shown in Figure 14, are actuated by rocking levers and springs. Operating bar 28' is linked on the right hand end shown in Figure 19 with a link and slot connection 85 to a rocking lever 86 pivoted on a pintle 87 to a block support 88 carried by and secured to a rail 95 which in turn is fixedly carried by the back frame 3'. The rocking lever 86 has a roller 89 on one end adapted to contact a dog or cam 90 fixedly carried by the movable front frame 3. On the left hand end of the operating bar 28' in Figure 19, is another rocking lever 91 connected with a link and slot connection 92 to the bar 28' and pivotally carried at 93 by a block support 94 carried by the opposite rail 95', which rail is also securely carried by back frame 3'. The rails 95 and 95' correspond to the rails 13 and 13' in Figure 1 and are for the same purpose of supporting rollers thereon for movement of the frame 3 relative to frame 3'. The rocking lever 91 has a roller 96 and a terminal roller 97. The roller 96 is adapted to contact a dog or cam 98 fixed to the movable frame 3, and the roller 97 is adapted to contact the left hand end of operating bar 30'. The operating bar 28' has attached thereto a plurality of springs 99 which are also attached to the back frame 3' thus providing a flexible connection between the frame and bar. Correspondingly, operating bar 30 and front frame 3 are flexibly connected with springs 99'.

The operation of the mechanism shown in Figure 19 is for the purpose of rotating the display elements upon separation of the frames. The frames are separated by solenoids like 26 and 26' or other actuator, through the means of drive rods, bell-cranks, and connecting rods as shown in Figure 3. However, the elements 78, 79, 80, 81 and 82 of Figure 3 are not required and are not present in Figure 19, since the operating trigger bars 28' and 30' are moved by rocking levers and not by hydraulic push rods. In Figure 19, when the frames are separating, due to the solenoid pull, the cam or dogs 90 and 98 secured to the front frame 3, in its movement away from the back frame 3', hit the rollers 89 and 96 on the rocking levers 86 and 91, and rock the levers about their pivots, so that the operating bar 28' is forced to the left against the tension of the springs 99. Concurrently, due to the roller 97 contacting the left end of operating bar 30', the latter moves toward the right against the tension of springs 99'.

The trigger dogs (not shown) carried by the operating bars as in Figures 4, 5 and 6 rotate the tubes (not shown) in the same manner as in Figures 4, 5 and 6. After the rotation of the tubes into display position, the frames close due to springs 57, and the springs 99 and 99' pull the operating bars 28' and 30' and the trigger dogs they carry back to their original position. It is clear from the above, that before the motion of the front frame from the back frame is completed, but after the tubes 4 are clear of the tubes 4', the cams 90 and 98 actuate the rocking levers 86 and 91, and these levers slide the respective operating bars 28' and 30', the bar 28' sliding to the left and the bar 30' sliding to the right.

The mechanism herein has been described in the preferred form of Figures 1, 2 and 3 and in the modification shown in Figure 19 with springs 57 which are shown in Figure 3 for returning the frames to closed position. These springs may be supplemented in their action by springs (not shown) associated with the solenoids for extracting the solenoid plungers. Instead of springs 57, an additional or third solenoid can be used to return the frames to closed position, thus eliminating springs 57. The use of a solenoid or solenoids has been described as the means for actuating the frames into open and/or closed position. This is preferred for small signs, but in large signs it may be preferable to dispense with solenoids or springs and utilize a double acting hydraulic ram or a double acting air cylinder as the means for separating the frames 3 and 3' into open position and for returning the same to closed position.

The mechanism shown in detail in Figure 6 may be used to advantage in causing the rotation of a single tube sign. Where such a sign is desired for rotation at timed intervals to present a number of successive sign faces of a single tube to view, the specific dog and pawl mechanism shown may be used, the operating bar carrying the trigger dog 44 being actuated by direct reciprocating movement imparted by any suitable mechanism stationarily mounted on a suitable support. A double-acting hydraulic ram mechanism may be used for such reciprocating movement.

The sign changing mechanism devices described above in Figures 1 to 15 and 19 may be independently supported on or carried by any suitable base or supporting structure. However, it is also a feature of the invention to combine the same with complementary lighting effects synchronized with the action of the display elements to present varied black and white or color effects as the pictures change; to provide illumination means and circuits including timing mechanism for changing the illumination in synchronization with the display actuating mechanism, and method for such operation and illumination.

Figure 17:
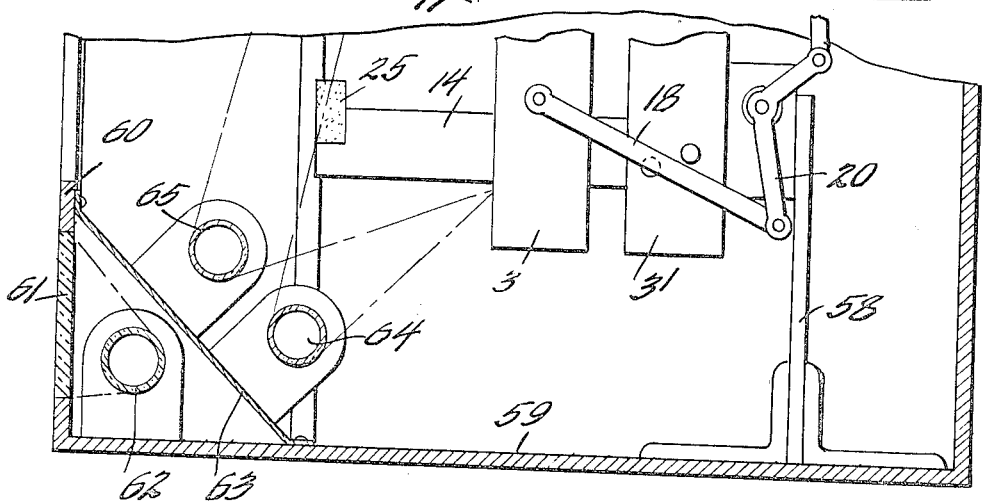
Figure 17 is a view along the line 17—17 of Figure 16 showing the mounting of the illumination means.

Referring to Figures 16 and 17, the changeable sign operating mechanism is combined with illuminating or lighting means therefor. The frames 3 and 3' and the mechanism for moving them relatively to each other is diagrammatically shown in Figure 17, with the back frame 3' supported on the corner support 58, the base of which is mounted in a box-like housing 59 having a front border 60 around the perimeter thereof. The front border has advertising letter cutouts 61 which are illuminated from within by border lights 62 mounted adjacent thereto, the border lights being separated from the interior of the housing 59 by the reflector partition 63 which masks the display elements 4 and 4' from the illumination of the border lights. Mounted on the inside of the reflector partition are the white light 64 and the ultraviolet (black) light 65, both of which are adapted to illuminate the rotatable display tubes 4 and 4' previously described. The border lighting and the white light 64 are preferably fluorescent and of the 4500° type.

The lighting system wiring circuit is shown in Figure 18, in conjunction with the timing mechanism and the solenoid frame-operating circuit and the hydraulic motor operating circuit. In Figure 18, the motor 66 operates a timer 67 having internal gears (not shown) which rotate a shaft having three make-break contacts 69, 70 and 71 on cams which contacts complete three circuits A, B and C respectively. Circuit A is the circuit for white light 64, circuit B is for the ultraviolet or "black" light 65, while circuit C is for the border lights 62 and solenoids 26 and 26', transformers A', B' and C' being in the respective circuits. A fourth circuit D controls the hydraulic fluid which actuates the rams 31 and 31'.

As shown in Figure 18, the white lights and so-called "black" or ultraviolet lights are at the top and bottom only, while the border lights are on all sides. A cycle of lighting effects takes place whereby with the border lights 62 on and the solenoid on, the white and black lights 64 and 65 are off. The frames separate, the picture changes, and the front frame returns. The border lights go off as the solenoids are deenergized, then white lights illuminate the picture, followed by black lights. The sequence just described is controlled by the electric timer 67 in Figure 18 having three circuits. The first circuit A illuminates the sign with white light for any suitable predetermined period, the frames 3 and 3' being in closed or meshed position; the timing motor switches off the white light and simultaneously switches on the "black" light in circuit B thereby changing the color of the same sign seen before, the frames still being in closed position. At the end of this second phase of predetermined time, the timing motor switches off the "black" lights (the white lights still being off) and simultaneously switches on the border lights in circuit C and solenoids 26 and 26' so that the mechanism is actuated, the frames separated, the tubes rotated and returned to meshed position for the next display, and the entire cycle is repeated. This will be done four times before the entire display on all of the faces of the square tubes will be seen.

The system of illumination described is, as described, coordinated with the rotation of the display tubes. As indicated in Figure 18, the separation of the frames trips the switch to cause the hydraulic rams to operate and rotate the tubes. In the modification of Figure 19, the display tubes are rotated by the separating movement of the frames due to the action of the rocking levers.

It will be observed that the frames 3 and 3' are hidden from view in the completed structure as shown in Figure 16, the housing 59 and its front border constituting a picture frame effect for the display elements 4 and 4', which of course carry the main advertising, the letters of the border being supplementary in the advertising appeal. These letters are inset plastic or glass. The lettering may be one piece or formed by round colored beads set into holes. The housing 59 may be made of any suitable material structurally strong enough to serve the purpose.

It will be apparent from the above description that the objects of the invention are achieved and the preferred mode of practicing the same is disclosed. The invention is not slavishly restricted to the specific means, devices, or methods hereindescribed, as modifications and changes will be apparent to those skilled in the art without departing from the scope and spirit of the invention, and such is not to be limited except as expressed in the appended claims.

I claim:

1. A changeable sign mechanism including a front frame, a back frame, a plurality of first named rectangular display elements mounted on the front frame, a plurality of second named rectangular display elements mounted on the back frame, means for moving the frames relatively toward and away from each other, and means carried by the respective frames responsive to the movement between the frames away from each other to rotate the rectangular display elements.

2. A changeable sign mechanism having in combination a back frame, a plurality of rectangular display elements rotatably mounted on the back frame, track means carried by the back frame, a front frame slidably mounted on the track means, a plurality of rectangular display elements rotatably mounted on the front frame in alternate position with regard to the display elements mounted on the back frame, means for moving the front frame on the track means away from the back frame whereby the rotatably mounted display elements on both frames are in staggered position.

3. In a changeable sign apparatus, a display element rotatably mounted on a frame support, a composite cam and detent receiving element secured to the display element, an operating bar slidably mounted on the frame support, a pawl detent pivotally mounted on the frame support and engageable with the detent of the cam-and-detent receiving element, and a trigger dog including a pair of projections thereon and which trigger dog is mounted on the operating bar, said projections being operable to release the pawl detent and to engage the cam of the cam-and-detent receiving element to rotate the display element.

4. A changeable sign mechanism having in combination a pair of frames relatively movable toward and away from each other, a plurality of display elements rotatably mounted in staggered relation on the frames, means for causing relative movement between the frames, and means responsive to the movement between the frames away from each other to cause the display elements to rotate on the frames.

5. A changeable sign mechanism comprising in combination a plurality of complementary supporting frames movable toward and away from each other, a plurality of rotatable sign display elements mounted rotatably on the frames in abreast alignment in composite relation, means for moving one of the frames away from a complementary frame to separate the display elements into staggered formation, means for rotating the display elements, and means for returning the frames to their original position with the display elements in aberast alignment in rotated positions.

6. In a changeable sign apparatus, the combination of a pair of display element supporting frames, at least one display element rotatably mounted on each of said frames in offset position in relation to each other, an operating bar slidably mounted on each of said frames, means for separating the frames and the respective display elements mounted thereon, means carried by the operating bars to rotate the display elements when in separated position, and means for returning the frames into nonseparated position with their respective display elements thereon in rotated position.

7. A changeable sign apparatus including in combination a pair of supporting frames, at least one first named display element rotatably mounted solely on one of the frames, at least one second named display element rotatably mounted solely on the other of the frames in a position offset to a first named display element, means for moving the frames relatively toward and away from each other to provide open and closed positions, and means for rotating the display elements when in open position.

8. A changeable sign display apparatus comprising in combination a pair of display supporting frames capable of being relatively movable toward and away from each other to assume open and closed positions, a plurality of display elements rotatably mounted independently on said respective frames and being in mesh to provide a continuous display panel when the frames are in closed position, each of said display elements having a plurailty of display surfaces, means for moving the frames to open position to cause the display elements to move out of mesh, and means for rotating the display elements when out of mesh to bring into view new display surfaces, whereby upon return of the frames into closed position with the display elements again in mesh a different display panel is provided.

9. A changeable sign apparatus including in combination a pair of frames of angular cross-section, a plurality of display elements rotatably mounted on each of the frames, each display element having a plurality of unit display surfaces each of which individually forms a continuous display panel when aligned with individual unit display surfaces of other display elements, the display elements on one frame being mounted in offset relation to the display elements on the other frame, means for separating the frames and causing the offset display elements to assume a staggered relation and to clear from one another to permit rotating movement, means for rotating the display elements to bring new unit surfaces to view, said latter means being actuated by means responsive to the movement of the frames during separation.

10. A changeable sign mechanism including a pair of frames relatively movable with respect to each other, at least one rotatable display element rotatably mounted on one of the frames, a fluid operated ram reciprocably mounted on said last named frame, means for moving said frames apart, means actuated by the movement of the last named means to move the ram in one direction, and means responsive to the movement of said ram in said direction to rotate said display element.

11. In a changeable sign apparatus, the combination of a pair of display element supporting frames, at least one display element rotatably mounted on each of said frames in offset position in relation to each other, a double-acting ram reciprocably mounted on each of said frames, an operating bar slidably mounted on each of said frames, means connecting each ram to each operating bar respectively, means for separating the frames and the respective display elements mounted thereon, means carried by the operating bars operable to rotate the display elements when the frames are in separated position, and means operative upon the separation of the frames to actuate the rams and thereby cause rotation of the display elements.

12. In a changeable sign apparatus, the combination of a pair of display element supporting frames relatively movable into open and closed positions, at least one display element rotatably mounted on each of said frames in offset position in relation to each other, a double-acting ram reciprocably mounted on each of said frames, an operating bar slidably mounted on each of said frames and connected to each ram, means carried by the operating bars operable to rotate the display elements, means operative upon the opening of the frames to cause actuation of the rams to effect rotation of the display elements, and means to cause reciprocation of the rams.

13. In a changeable sign apparatus, the combination of a pair of frames adapted to carry display elements, each of the frames having laterally disposed portions cut out to provide a plurality of rectangular openings therein alternating with laterally disposed rectangular projections, the projections on one frame being offset from the projection on the other frame and the openings on one frame being offset from the openings on the other frame, display elements rotatably mounted in the lateral projections, means to move the frames relatively to each other to provide in-mesh or out-of-mesh arrangement of the display elements, and means to rotate the display elements when they are out of mesh.

14. A changeable sign apparatus comprising in combination a plurality of complementary supporting frames relatively movable toward and away from each other to assume open and closed positions, a plurality of rotatable sign display elements square in cross-section rotatably mounted independently on the respective frames in composite non-rotatable relation when the frames are in closed position to present a sign display, means for moving the frames relatively toward and away from each other into open position to separate the display elements into rotatable relation and into closed position after rotation has ben accomplished, means for rotating the display elements when in open position to present a different sign display when the frames are returned to closed position, and means for causing continuous opening and closing of the frames in timed relation to present a sequence of displays.

15. In a changeable sign apparatus, the combination of a pair of separable frames adapted to carry display elements, one of the frames being stationary and the other movable, track means carried by the stationary frame, shaft means carried by the movable frame, roller means on the shaft means and operable to ride on the track means, bell-crank means pivoted on the stationary frame, drive rod means linked to the bell-crank means on an arm thereof, connecting rod means linked to the bell-crank means on the other arm thereof and to the shaft means, and actuator means connected to the drive rod whereby the movable frame may be moved away from the stationary frame.

16. In a changeable sign apparatus, the combination of a pair of display element supporting frames, at least one display element rotatably mounted on each of said frames in offset position in relation to each other, a plurality of guide rollers carried by each of the frames, operating bars mounted in said guide rollers on said frames, means carried by the operating bars to rotate the display elements, means for separating the frames and the respective display elements mounted thereon, fluid-operated means carried by each of the frames and connected to said operating bars, and means effective upon the separation of the frames to actuate the fluid-operated means and thus cause rotation of the display elements.

17. A changeable sign apparatus having in combination a pair of frames, one of said frames being stationary and the other of said frames being movable with respect thereto, power actuated means for moving the second named frame away from the first named frame into open position, a plurality of display elements rotatably mounted on the first named frame in spaced apart positions, a plurality of display elements rotatably mounted on the second named frame in spaced apart positions offset from the spaced apart positions of the first named display elements, an operating bar slidably mounted on the first named frame, a second operating bar slidably mounted on the second named frame, fluid-operated means carried by each of the frames and connected to said operating bars respectively, trigger dogs carried by the operating bars, pawl detents pivotally mounted on the frames, composite cam-and-detent receiving means secured to the display elements, and means responsive to the opening movement of the frames to cause the fluid-operated means to move the operating bars and cause the trigger dogs to engage the cams of the composite cam-and-detent receiving elements and disengage the pawl detents to rotate the display elements.

18. A changeable sign apparatus including in combination a pair of frames relatively movable to each other in open and closed positions, actuator means including a drive-rod to move said frames into open position, a hydraulic double-acting ram mounted on each of the frames, display elements rotatably mounted on the frames, a push-pull rod connected to each ram, an operating bar connected to each push-pull rod to effect rotation of the display elements, an electrically operated hydraulic valve supplying hydraulic fluid to actuate the rams, an electrical circuit for said hydraulic valve, a switch normally open in said circuit, means on said drive-rod engageable with said switch to close the same when the frames are being moved into open position and thereby cause movement of the rams and the operating bars to effect rotation of the display elements, a second switch normally closed in said circuit, one of said push-pull rods being engageable with said second switch to open the same and thereby cause reciprocation of the rams to their original positions.

19. A changeable sign apparatus including in combination a pair of frames relatively movable to each other in open and closed positions, solenoid means having a drive-rod connected thereto for moving said frames into open position when the solenoid is energized, an electrical circuit for said solenoid means, a hydraulic double-acting ram mounted on each of the frames, display elements rotatably mounted on the frames, a push-pull rod carried by each ram, an operating bar connected to each push-pull rod to effect rotation of the display elements, an electrically operated hydraulic valve supplying fluid to actuate the rams, an electrical circuit for said hydraulic valve, a switch normally open in said last-named circuit, a cam on the drive-rod engageable with said switch to close the same upon movement of the frames into open positions and thereby cause actuation of the rams to effect rotation of the display elements, a second switch normally closed in said last-named circuit, one of said push-pull rods being engageable with said second switch to open the same and thereby cause reciprocation of the rams to their original positions, means in said solenoid circuit to deenergize said solenoid means when the frames are in open position, and means for returning the frames to closed position.

20. In a changeable sign apparatus, the combination of a pair of display element supporting frames, at least one display element rotatably mounted on each of said frames in offset position in relation to each other, a plurality of guide rollers carried by each of the frames, operating bars mounted in said guide rollers on said frames, means for separating the frames and the respective display elements mounted thereon, rocker lever means carried by one of the frames and connected to one of said operating bars, cam means carried by the other of the frames adapted to rock the rocker lever means upon separation of the frames, and means carried by the operating bars to rotate the display elements when in separated position.

21. A changeable sign apparatus having in combination a pair of frames, one of said frames being stationary and the other of said frames being movable with respect thereto, power actuated means for moving the second named frame away from the first named frame into open position, a plurality of display elements rotatably mounted on the first named frame in spaced apart positions, a plurality of display elements rotatably mounted on the second named frame in spaced apart positions offset from the spaced apart positions of the first named display elements, an operating bar slidably mounted on the first named frame, a second operating bar slidably mounted on the second named frame, rocker lever means carried by the first named frame and operable to move the said operating bars, trigger dogs carried by the operating bars, pawl detents pivotally mounted on the frames, composite cam-and-detent receiving means secured to the display elements, and means on the second named frame to actuate the rocker lever means upon opening movement of the frames to move the operating bars and cause the trigger dogs to disengage the pawl detents and to engage the cams of the composite cam-and-detent receiving elements to rotate the display elements, means to return the frames to closed position, and means to return the operating bars whereby the pawl detents and the trigger dogs are returned to original position.

22. An illuminated changeable sign including a pair of frames relatively movable toward and away from each other in sperated and non-separated positions, a plurality of display elements rotatably mounted on the frames, an electrical circuit including solenoid means actuated thereby for effecting separation of said frames, a second electrical circuit having illumination means for illuminating the display elements, a third electrical circuit, fluid operated means actuated by said third circuit, means responsive to the separation of the frames for causing the third circuit to actuate the fluid operated means to rotate the display elements, and timing means associated with the first and second circuits for energizing and deenergizing the solenoid means and for illuminating the display elements in timed relation.

23. In an illuminated changeable sign, the combination of a stationary frame and a movable frame, a housing for said frames having a border, display elements rotatably mounted on said frames, hydraulic ram means on the frames for rotating the display elements, an electrical timing mechanism controlling electrical current to three circuits, lighting means in said housing in a first circuit for illuminating the display elements, additional lighting means in said housing in a second circuit for contrast illuminating of the display elements, lighting means in said housing in a third circuit for illuminating the housing border, solenoid means in said third circuit for moving the movable frame from the stationary frame, a fourth circuit, hydraulic valve means in said fourth circuit for actuating the hydraulic ram means, the electrical timing means being operable to cause current to temporarily flow through the three first-named circuits in timed sequence to produce lighting effects upon the display elements and the border and to energize the solenoid means in the third circuit to separate the frames, means responsive to the separation of the frames to cause current to flow in the fourth circuit and actuate the hydraulic valve means to cause the hydraulic rams to rotate the display elements, and means carried by the hydraulic rams to discontinue the current flow in the fourth circuit upon completion of the rotation of the display elements.

24. A changeable sign having complementary lighting effects comprising a pair of frames relatively movable toward and away from each other and carrying rotatable display elements rotatably mounted on the frames, an exterior housing for the frames having white lights and ultraviolet lights therein to illuminate the display elements, border lights in said housing, electrically operated means to separate the frames, electric timing means operable to switch off the white lights and simultaneously switch on the ultraviolet lights for a predetermined time, thereafter switch off the ultraviolet lights and switch on the border lights and simultaneously energize the electrically operated means; means responsive to the separation of the frames for rotating the display elements while the border lights are switched on, the electric timing means being operable thereafter to switch on the white lights and simultaneously switch off the border lights when the rotating movement of the display elements is completed.

References Cited in the file of this patent

UNITED STATES PATENTS

| | | |
|---|---|---|
| 714,839 | Watson | Dec. 2, 1902 |
| 1,058,698 | Goldstein | Apr. 8, 1913 |
| 1,201,670 | Witz | Oct. 17, 1916 |
| 1,480,375 | Cristadoro | Jan. 8, 1924 |
| 1,765,073 | Hester | June 17, 1930 |
| 2,105,209 | Bennett | Jan. 11, 1938 |
| 2,115,937 | Bartness | May 3, 1938 |
| 2,277,323 | Hjermstad | Mar. 24, 1942 |
| 2,514,049 | Graham | July 4, 1950 |